Feb. 1, 1944.  T. WAUGH  2,340,782
METHOD OF AND APPARATUS FOR FORMING HOLLOW GLASSWARE
Filed May 19, 1939  2 Sheets-Sheet 1
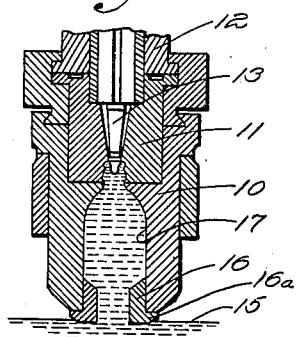
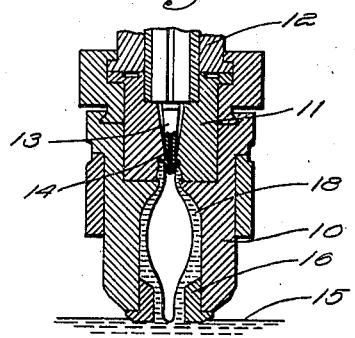
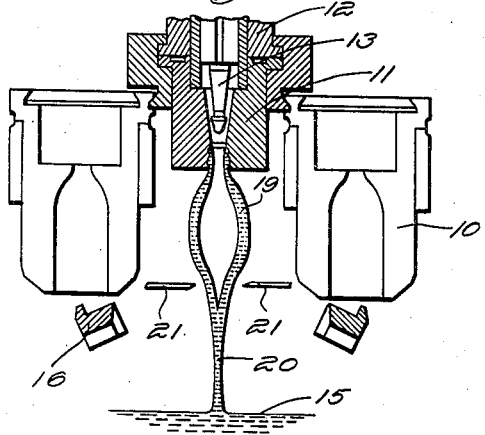
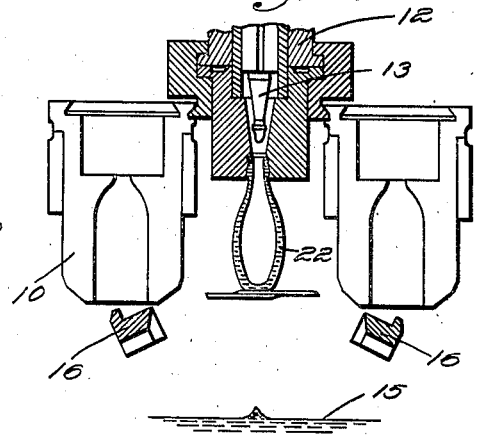
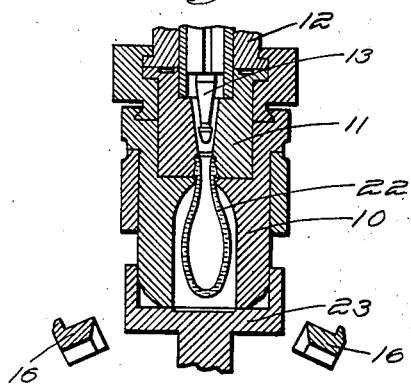
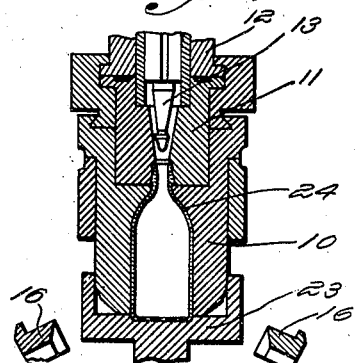
Witness
W. B. Thayer
Inventor
Thomas Waugh
by Brown & Parham
Attorneys Feb. 1, 1944.    T. WAUGH    2,340,782
METHOD OF AND APPARATUS FOR FORMING HOLLOW GLASSWARE
Filed May 19, 1939    2 Sheets-Sheet 2
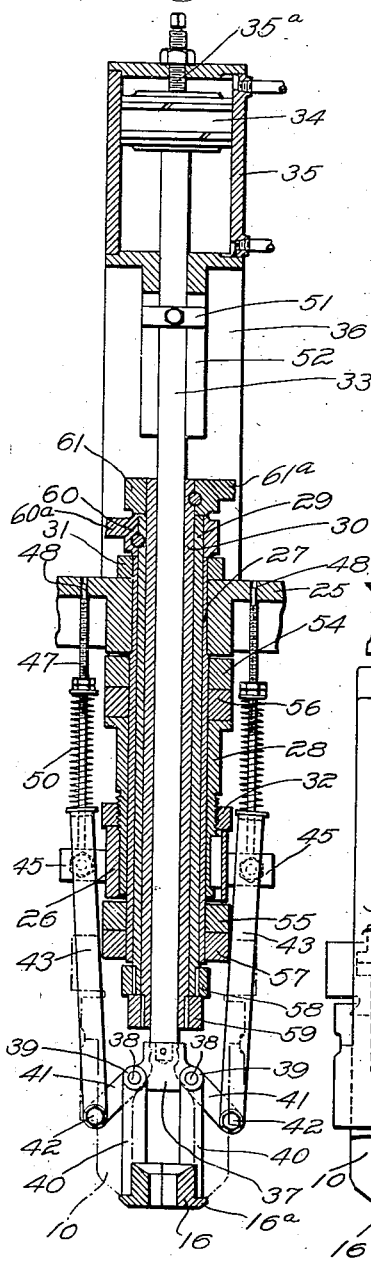
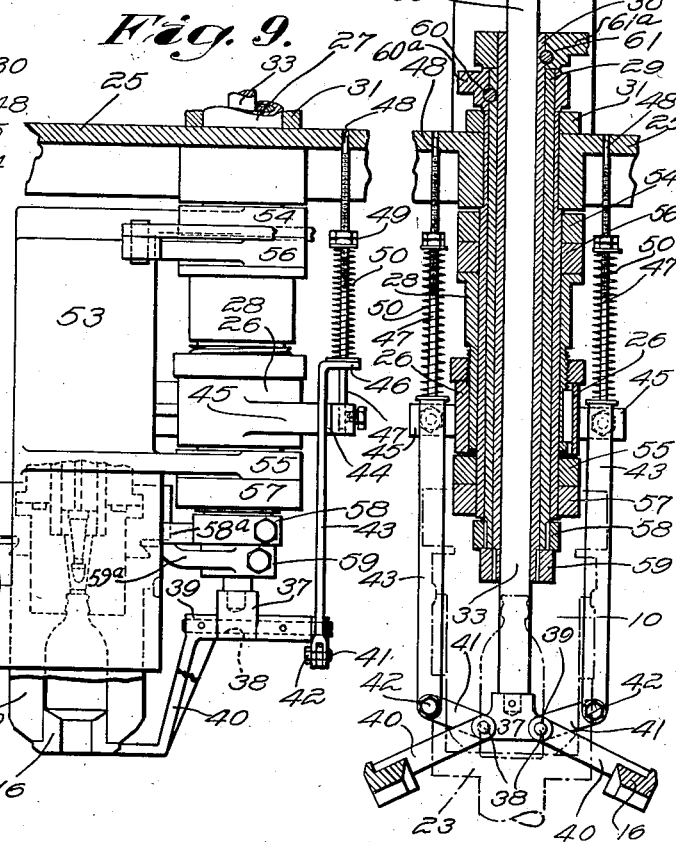
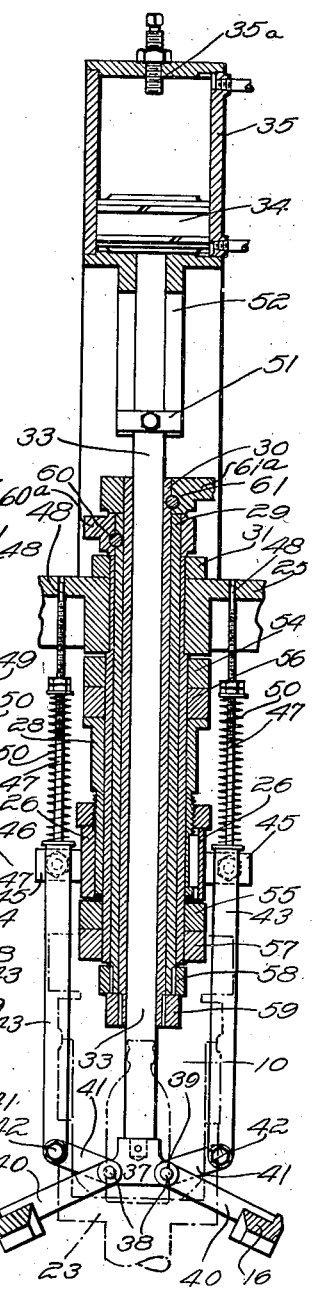
Inventor
Thomas Waugh
by Brown + Parham
Attorneys
Witness
W. B. Thayer Patented Feb. 1, 1944

2,340,782

UNITED STATES PATENT OFFICE 2,340,782

METHOD OF AND APPARATUS FOR FORMING HOLLOW GLASSWARE

Thomas Waugh, West Hartford, Conn., assignor to Hartford-Empire Company, Hartford, Conn., a corporation of Delaware Application May 19, 1939, Serial No. 274,571

10 Claims. (Cl. 49—18)

This invention relates to the manufacture of bottles and other articles of glassware by the fill and empty method of the suction mold charging type.

A fill and empty method of this type includes a step of gathering molten glass in a molding receptacle by suction on the surface of a supply pool. Thereafter, a predetermined amount of the gathered glass is emptied or expelled from the interior thereof to leave a hollow glass body or parison in the receptacle. This hollow glass body or parison is separated from the excess glass and is subsequently formed into a bottle or other article of glassware.

An object of the present invention is to provide a novel way of and novel means for regulably controlling the effective capacity of a molding receptacle in which charges are to be gathered by suction substantially as above described, whereby the weight of glass in the final article formed of each such charge may be accurately predetermined and controlled.

A further object of the invention is to regulably control the effective glass capacity of a molding receptacle of the character described in such a manner and by such means that not only may the weight of the glass gathered in such receptacle be regulably controlled for each charge but the same molding receptacle may be employed to form a predetermined portion of the gathered glass into a hollow parison and the hollow parison into an article of the final shape desired.

A further object of the invention is to provide a novel way of and a novel means for regulably controlling the size, shape and wall thickness of the lower portion of the hollow glass body or parison that is produced by the expulsion from the glass gathering mold of an internal portion of the gathered glass charge.

A still further object of the invention is to provide in a fill and empty method of the character described a novel way of and means for controlling the formation of the lower portion of a hollow glass body that remains after an internal portion of a gathered charge has been expelled or emptied from the charge gathering receptacle so as to facilitate the operation of glass cutting shears in cutting through such portion of the hollow body to provide a separated hollow glass parison having a closed bottom portion.

According to the present invention, a vertically adjustable removable bushing is associated with the lower portion of a suction gathering mold so as to serve as a glass intake member during the filling of the mold cavity by suction on an underneath gathering pool and thereby to control the amount of glass that can enter the cavity of the mold during such gathering operation. This bushing has the further function of providing an annular space in the lower portion of the mold cavity when the bushing has been withdrawn therefrom at a subsequent stage in the operations of forming a bottle or other article of glassware. This space may be utilized for the reception of the expanding lower portion of a hollow glass body or parison in the gathering mold so that such hollow glass body or parison may be expanded to final form in the same mold in which the glass for such article was gathered. The bushing also controls the shape and formation of the lower portion of the hollow glass body or parison. A hollow glass body or parison thus may be initially formed with a tapering lower end portion which can be readily severed by glass cutting shears to cut off excess glass and to produce a glass parison that is suitable for expansion into a bottle or other article of glassware.

Other objects and advantages of the invention will hereinafter be pointed out or will appear from the following description of a typical series of steps of the method and of novel structural features of a practical embodiment of the invention, as shown in the accompanying drawings, in which Fig. 1 is a fragmentary vertical sectional view of a glass gathering and parison forming structure in the position at the surface of a glass gathering pool at which the cavity of the structure was filled with glass by suction on the surface of the pool, Fig. 2 is a similar view showing the same structure after a predetermined amount of the gathered glass charge has been expelled from the interior thereof, back into the gathering pool, Fig. 3 is a fragmentary vertical sectional view of the structure of the preceding views after such structure has been lifted from the gathering pool, the sections of the body mold have been opened, and the bushing at the lower end of the body mold has been removed therefrom and the sections thereof opened, Fig. 4 is a view at the stage of operations subsequent to that shown in Fig. 3 at which the hollow glass body or parison has been separated from the glass connection with the pool by the closing of a pair of shear blades, Fig. 5 is a view showing a complete article forming mold unit that has been provided by applying a bottom plate to the body mold after the sections of the latter have been closed to surround the pendent body of the hollow glass parison, Fig. 6 is a view showing the finally formed glass article in the complete mold unit after blowing pressure has been introduced into the hollow glass body or parison of Fig. 5 to expand the latter to the shape of the cavity of the closed complete mold unit, Fig. 7 is a fragmentary vertical sectional view of means for supporting and operating the relatively movable parts of the glass gathering and parison forming structure of Figs. 1 to 4, inclusive, and in particular for effecting desired vertical movements of the bushing relatively to the body mold and opening and closing movements of the sections of such bushing, the view showing the bushing closed and at an elevated position within the cavity of the body mold, Fig. 8 is a view similar to Fig. 7 but showing the sections of the bushing open after such bushing has been moved downwardly from the body mold and showing in outline the bottom plate in position to supplement the closed body mold, the relative positions of the parts being substantially as shown in Figs. 5 and 6, and Fig. 9 is a fragmentary view, partly in vertical section and partly in side elevation, as viewed from a plane substantially at a right angle with the plane of Fig. 7.

In carrying out the invention, I may make use of a glass gathering and parison forming structure comprising a two-part body mold 10, a two-part neck ring 11, and an associate head 12 in which is disposed a vertically reciprocable neck pin or plunger 13. The neck pin or plunger may be provided with a central bore or passage 14 (Fig. 2) through which air under pressure may be supplied to glass within the glass gathering structure at the proper times to effect results such as presently will be described. The head 12 also may be provided with a suitable passage or passages (not shown) by which sub-atmospheric pressure may be applied through the usual or suitable suction grooves in/or between the sections of the neck ring 11 and/or the body mold 10 to effect filling of the cavity of the gathering structure with glass from a gathering pool 15 when the glass gathering structure has been lowered to a suitable position at the surface of the pool.

The parts described so far and the glass gathering operation referred to are well known in the art to which the present invention relates.

A novel structural feature of the invention resides in the provision of a bushing 16 which has a body portion of suitable external configuration and size to fit closely but slidably in the cavity 17 of the body mold 10 when inserted at the lower end of the latter. The extent of projection of this bushing 16 into the cavity 17 of the body mold may be varied to vary the effective capacity of the glass receiving space in the neck ring and body mold combined. As shown, in Figs. 1, 2, 7 and 9, the bushing is at the upper limit of its possible movement in the body mold so that an external flange 16a at its lower end abuts the lower end of the closed body mold.

The bore of the bushing 16 should be of sufficient size with relation to the diameter of the cavity of the body mold to assure adequately quick filling of the available space in the glass gathering structure when such structure is in its glass gathering position at the surface of the pool 15, and also to permit desirably quick expulsion or emptying of glass from the interior of the gathered charge at a subsequent stage of operations. The bushing 16 may be formed in two cooperative parts for a purpose to be presently described.

As shown in Fig. 1, the glass gathering structure is at its glass gathering position at the surface of the pool 15 and has been filled with molten glass from such pool, suction being employed for this purpose, as is usual.

In Fig. 2, a hollow glass body 18 remains in the cavity of the gathering structure after a predetermined amount of gathered glass has been expelled from the interior of the charge by air under pressure applied thereto through the neck pin or plunger 13.

After the operation illustrated in Fig. 2, the gathering structure may be raised as a unit, as by appropriate movement of a suitable dipping frame of a complete machine, one example of which is hereinafter pointed out. The parts of the body mold may be opened, the bushing 16 may be lowered from the cavity of the body mold and the halves of such bushing opened so that these parts may then be located as shown in Fig. 3. At this stage of operations, a hollow glass body 19 is suspended by its neck portion from the closed neck ring 11, the lower end portion of such hollow glass body having assumed a tapering form and merging into a pendent tail 20 leading to the gathering pool. A suitable severing mechanism, represented by the shear blades 21 may then be operated to cut through the hollow glass body 19 at a predetermined height above the plane of the lower ends of the body mold sections 10, or at a lower level, if desired, so as to provide a separate suspended hollow glass parison 22 having a closed bottom portion as shown in Fig. 4.

Thereafter, the shear blades are removed, the halves of the body mold are closed and a bottom plate 23 is brought to position to close the lower end of the cavity of the body mold and to cooperate with such body mold and neck ring to constitute a final mold unit, substantially as shown in Fig. 5. The parison 22 may be permitted to reheat and elongate somewhat, both before the closing of the halves of the body mold and after, while it is still out of contact with the mold walls, as shown in Fig. 5. At a predetermined suitable time, air under pressure is introduced through the neck pin or plunger or in any other suitable way into the interior of the hollow parison to expand it to the shape of the interior of the final mold unit and thus to produce a bottle 24 as shown in Fig. 6 or other glass article desired.

Thereafter, the bottom plate 23 is removed, the bushing is closed and raised to a position within the cavity of the body mold, as to the position shown in Fig. 1, and the glass gathering structure again employed in a glass charge gathering operation. The operating means for the bottom plate 23 is not shown as the details thereof form no part of the present invention. Many such means are well known to those skilled in the art and one example of a suitable mechanism is that shown in the Rowe Patent 1,956,203 of April 24, 1934 for operating the bottom plate K, as shown in Fig. 24 of that patent.

The movements and operations of the several parts, substantially as described, or as required to meet other operating conditions, may be effected and controlled by any suitable known supporting and operating mechanism, such, for example, as that which is disclosed in Patent No. 2,106,546, granted Jan. 25, 1938, to R. W. Canfield and the present applicant jointly, for Apparatus for forming glassware.

Parts of such a supporting and operating mechanism, including means for movably supporting and operating the bushing 16 and the component parts thereof are shown in Figs. 7 to 9, inclusive.

In these views, supporting frame members are indicated at 25 and 26 respectively, and may be parts of a movable dipping frame or ram (not shown) of a complete machine. These frame members have vertically aligned openings for the reception of an inner sleeve 27, the opening in the frame member 26 being sufficiently larger than that in the member 25 to accommodate an outer sleeve 28 on the sleeve 27. Concentric tubular shafts 29 and 30, respectively, are journaled in the sleeve 27. Nuts 31 and 32 at the upper portion of the sleeve 27 and an intermediate portion of the sleeve 28, respectively, Fig. 7, rest on the frame members 25 and 26, respectively, and serve to retain the several parts just mentioned in assembled positions.

A vertically reciprocable shaft 33 depends through the inner tubular shaft 30 from a piston 34 in a cylinder 35 which is supported by an upright 36 on the upper frame member 25. The shaft 33 is provided at its lower end with a head 37 which is formed to provide bearings for the shafts 38 of bell crank levers 39. The bell crank levers 39 have downwardly extending arms 40 connected with the sections of the bushing 16 and slightly higher arms 41, each of which extends at an acute angle with its associate arm 40 and is connected at its outer end pivotally, as at 42, with an upwardly extending rod 43. The rods 43 extend vertically close to head 37 through slots 44 on out-turned arms 45 on the frame member 26. Each rod 43 has its upper end portion out-turned, as at 46, so as to strike the upper part of the arm 45 after a given downward movement of the rod 43 and thus to limit further downward movement of the rod 43 and of the attached end of the arm 41 of the associate bell crank lever.

A guide rod 47 extends upwardly from each of the arms 45 on the frame member 26 through an opening in the outturned portion 46 of the movable rod 43. The upper end of each rod 46 may be secured, as at 48, in a suitable opening in the upper frame member 25. Each rod 47 is screw threaded for engagement with nuts 49 which may be adjusted to maintain under compression coil springs 50 which are located on the rods 47 between such nuts and the out-turned ends 46 of the movable rods 43. The vertical shaft 33 may be held against accidental turning about its longitudinal axis, as by a slide block 51 which moves with the rod 33 in a fixed vertical guideway 52 at the lower end of the cylinder 35.

From the foregoing description of the mechanism for supporting and operating the sections of the bushing 16, the operation of such mechanism will be readily understood. When the piston 34 is at the upper end of its stroke in the cylinder 35, as shown in Fig. 7, the bushing 16 is located within the cavity of the body mold 10 as shown. Downward movement of the piston 34 will effect a like movement of the head 37 at the lower end of the rod 33 and of the bell crank levers 39 as units until the out-turned ends 46 of the rods 43 strike the arms 45 on the frame member 26. This will move the bushing 16 downwardly from the cavity of the body mold 10. Further downward movement of the piston 34 and of the head 37 will actuate the bell cranks 39 so that they will be swung about their pivotal connections at 42 with the rods 43 and the halves of the bushing 16 will be opened, as to the positions shown in Figs. 3 to 6, inclusive, and Fig. 8.

When the piston 34 starts upward, the compression of the springs 50 will suffice to prevent upward movements of the rods 43 until the sections of the bushing have been closed. Thereafter the head 37, the bell cranks 39 and the rods 43 will be moved upward as a unit against the compression of the springs 50 and the closed bushing will be raised to locate the upper end of the bushing at the level desired in the body mold. This level may be varied by adjusting the stop screw 35—a, Figs. 7 and 8, to limit the extent of upward movement of the piston 34 in the cylinder 35.

One of the halves of the body mold 10 may be connected, as by the casting indicated at 53, Fig. 9, with vertically spaced hubs 54 and 55 on the sleeve 27, while the other half of the body mold may be similarly connected with spaced hubs 56 and 57, respectively. The halves of the neck ring may be connected, as by rigid arms 58a and 59a, Fig. 9, with hubs 58 and 59, respectively, on the lower end portions of the hollow shafts 29 and 30, respectively. The shafts 29 and 30 may be provided with operating rings 60 and 61, respectively, at their upper ends. These operating rings may have crank arms 60a and 61a, respectively, Figs. 7 and 8. Any suitable operating mechanism, of which an example is that shown connected with the crank arms 46 and 47, Fig. 19, of the aforesaid Canfield et al. Patent 2,106,546, may be provided to impart rotary movements in opposite directions to the rings 60 and 61 and through them to the hollow shafts 29 and 30. Such movements of the hollow shafts 29 and 30 will be effective by reason of their rigid connections with the halves of the neck ring to open and close the neck ring. Likewise, the hubs 54, 55 and 56, 57 may be given rotative movements at the proper times to open and close the halves of the body mold. The specific means for effecting such movements of the parts of the body mold and of the neck ring and their connections may be substantially as disclosed in the patent to Canfield and the present applicant, No. 2,106,546, hereinbefore referred to.

I do not desire to be limited to the exact details of construction shown and described, for obvious modifications will occur to persons skilled in the art.

What I claim is:

1. The method of forming an article of hollow glassware which comprises gathering molten glass from a gathering pool in an open-bottomed suction gathering receptacle comprising an upper article-neck forming portion and an openable parison-body forming portion located in contact at its bottom with the surface of said pool and so shaped internally as to form the gathered glass therein into an upper article neck portion in the upper end portion of said receptacle, a main body portion filling the greater part of the gathering receptacle and having a relatively large diameter, a sharply tapered body portion at the lower end of said main body portion, and a lower end portion of greatly reduced diameter as compared with the diameter of said main body portion and occupying the lower end portion of the gathering receptacle, expelling the central portion of the gathered glass of said body downwardly through said lower end portion of the body to make said body hollow from its upper end downwardly through its said lower end portion, opening said parison body forming portion of the receptacle while suspending the hollow body by its upper neck portion from said neck forming portion of the receptacle, cutting through the lower end portion of said suspended hollow body to produce a suspended hollow parison having a closed bottom and of a predetermined length, and thereafter forming said hollow parison into the article of hollow glassware desired.

2. The method of forming articles of hollow glassware which comprises gathering a charge of molten glass by suction from a gathering pool into a gathering receptacle comprising an upper neck forming portion and a lower openable body mold having a removable openable bushing disposed in a lower portion thereof during the glass gathering operation, expelling part of the gathered glass charge from the interior thereof in the downward direction through an annulus of glass in said bushing to produce a hollow glass body, opening the body mold and said bushing, cutting through said hollow body at a predetermined distance above the lower end thereof to produce a suspended hollow parison having a closed bottom and of less length than the interior of said gathering receptacle, closing the body mold around the body of the suspended parison while maintaining the parts of the bushing in open positions, thereby providing a glass expansion space in the lower portion of the body mold, closing the bottom of said receptacle below said parison to provide a complete final blow mold unit, and blowing the parison in said final blow mold unit to form the article of glassware desired.

3. In apparatus for forming articles of hollow glassware, a suction gathering receptacle comprising a body mold open at its lower end and a reducing bushing continuously open at both its upper and lower ends and insertable from below the body mold into the lower end portion only of the latter and then cooperating with the body mold to define, conjointly with the portion of the body mold above the bushing, an open-bottomed continuous suction cavity for the gathering of molten glass from the surface of a glass gathering pool, the portion of said cavity that is defined by said bushing having a diameter that is sharply reduced from that of the adjacent portion of the cavity immediately above the level of said bushing.

4. In apparatus for forming articles of hollow glassware, a suction gathering receptacle comprising a body mold open at its lower end, a reducing bushing insertable from below into the lower end portion of the body mold, said bushing being continuously open at both its upper and lower ends and cooperative with the body mold when inserted in the latter to define, conjointly with the portion of the body mold above the bushing, an open-bottomed continuous suction cavity for the gathering of molten glass from the surface of a glass gathering pool, and means for variably limiting the extent of insertion of said bushing into said body mold to regulably control and vary at will the effective glass receiving capacity of said cavity.

5. In glass forming apparatus, a glass gathering receptacle comprising a body mold formed of openable sections, a bushing formed of openable sections fitting in a lower end portion of the body mold and separable therefrom, means for opening the sections of said body mold and said bushing, and means for closing the sections of the body mold independently of the sections of said bushing.

6. In apparatus for forming articles of hollow glassware, a suction gathering receptacle comprising a body mold formed of openable sections, a bushing in the lower portion of said body mold also formed of openable sections and separable from the sections of the body mold, means for moving said bushing vertically independently of the body mold and for opening and closing the sections of the bushing when said sections are located at a plane below the level of the lower end of the sections of the body mold, and means for opening and closing the sections of the body mold.

7. In apparatus for forming articles of hollow glassware, a suction gathering receptacle comprising a body mold formed of openable sections, a bushing in the lower portion of said body mold also formed of openable sections and separable from the sections of the body mold, means for moving said bushing vertically independently of the body mold and for opening and closing the sections of the bushing when said sections are located at a plane below the level of the lower end of the sections of the body mold, and means for limiting the upper limit of the vertical movement of the bushing to vary the extent of projection of the upper end of the bushing into said body mold.

8. In apparatus for forming articles of hollow glassware, a suction gathering and molding receptacle comprising an open-bottomed body mold into which glass may be gathered from the surface of a glass-gathering pool by suction within said body mold when the latter is in contact at its bottom with the surface of said pool, and means for varying the effective area of the glass-receiving interior of the lower end portion only of the body mold during use of said receptacle in glass gathering and molding operations.

9. In apparatus for forming articles of hollow glassware, a suction gathering and molding receptacle comprising an open-bottomed body mold into which glass may be gathered from the surface of a glass-gathering pool by suction within said body mold when the latter is in contact at its bottom with the surface of said pool, and adjustable means for reducing the glass receiving capacity of the body mold from the lower end thereof for a predetermined variable part of the height thereof.

10. In apparatus for forming articles of hollow glassware, a suction gathering and molding receptacle comprising an open-bottomed body mold into which glass may be gathered from the surface of a glass-gathering pool by suction within said body mold when the latter is in contact at its bottom with the surface of said pool, and adjustable means for reducing the glass receiving capacity of the body mold from the lower end thereof for a predetermined variable part of the height thereof, said means being completely removable from the body mold and separable therefrom.

THOMAS WAUGH.